United States Patent [19]

Ueda et al.

[11] Patent Number: 4,632,250
[45] Date of Patent: Dec. 30, 1986

[54] MAGNETIC SHIELDING MEMBERS

[75] Inventors: Shu Ueda; Joe Narumiya, both of Sayama; Kenji Misawa, Nagoya, all of Japan

[73] Assignee: Dynic Corporation, Kyoto, Japan

[21] Appl. No.: 632,530

[22] Filed: Jul. 19, 1984

[30] Foreign Application Priority Data

Jul. 22, 1983 [JP] Japan ............................. 58-132830
Mar. 27, 1984 [JP] Japan ........................... 59-42851[U]

[51] Int. Cl.⁴ ............................................. B65D 85/84
[52] U.S. Cl. .................................. 206/524.2; 206/818; 360/132; 365/53; 365/55; 365/56; 335/302; 335/303; 428/900; 428/928
[58] Field of Search ............... 428/694, 900, 928; 360/132; 365/53, 55, 56; 206/444, 818, 524.2; 335/302, 303

[56] References Cited

U.S. PATENT DOCUMENTS

| | | | |
|---|---|---|---|
| 4,030,892 | 6/1977 | Mendelsohn et al. | 428/226 |
| 4,126,287 | 11/1978 | Mendelsohn et al. | 428/928 |
| 4,174,419 | 11/1979 | Nienart | 428/900 |
| 4,189,618 | 2/1980 | Bretts et al. | 428/222 |
| 4,223,361 | 9/1980 | Zaitsu et al. | 428/900 |
| 4,268,325 | 5/1981 | O'Handley et al. | 148/108 |
| 4,354,213 | 10/1982 | Martinelli | 428/900 |
| 4,368,447 | 1/1983 | Inomata et al. | 428/687 |
| 4,419,164 | 12/1983 | Martinelli | 428/900 |

OTHER PUBLICATIONS

Lyons; "Permanent Magnet Bias Schemes for Bubble Memory Applications" May 8, '1973, IBM Technical Report.

*Primary Examiner*—George F. Lesmes
*Assistant Examiner*—William M. Atkinson
*Attorney, Agent, or Firm*—Frishauf, Holtz, Goodman & Woodward

[57] ABSTRACT

A magnetic shielding device, adapted to protect a magnetic recording member against external magnetic fields, includes a plurality of spaced apart sheets of ferromagnetic material and the total thickness of the spacings between adjacent sheets of ferromagnetic material is selected to be larger than 0.5 mm. In a modification, the spaced sheets are covered with covers and the peripheral portions thereof are welded together. In another modification a sheet of insulating material having a surface area larger than those of the sheets of ferromagnetic material is interposed therebetween.

8 Claims, 5 Drawing Figures

MAGNETIC SHIELDING MEMBERS

BACKGROUND OF THE INVENTION

This invention relates to a magnetic shielding member or device capable of efficiently protecting a magnetic recording member against the adverse effects of external magnetic fields.

Recently, cash cards and credit cards, etc. are used in many banks and department stores and a person who utilizes such a card normally carries it with him. Furthermore, as a result of the tendency of office automation, floppy discs and magnetic tapes are abundantly used in many offices so that persons who utilize such discs or tapes always carry them.

Further, permanent magnets are used in many kinds of every day articles and articles in offices, for example clasps of handbags, magnetic plates, various therapeutic or health promoting devices, and toys. Permanent magnets having a strength of several thousands of gausses are used in articles of the type described above.

Magnetic information recorded in a magnetic recording member are alternated or erased by the strong magnetic field of such powerful permanent magnets, thus causing misoperation of an automatic cash pay-out machine installed in banks and of office automation machines. Various types of protective casings for containing or covering magnetic recording members have been proposed for the purpose of preventing the troubles described above. For example, a casing made of magnetic material and a casing made up of a lamination of a layer of crystalline magnetic metal having a high saturation magnetic flux density and a layer of amorphous metal having high permeability have been proposed. Each of them does not manifest the desired magnetic shielding effect. In addition, it is necessary to use special and expensive metals.

SUMMARY OF THE INVENTION

It is an object of this invention to provide a novel magnetic shielding member, for example in the form of a casing or a sheet, that can be manufactured with inexpensive and readily available material and which is convenient to carry.

According to this invention, there is provided a magnetic shielding member comprising two or more spaced laminated sheets of ferromagnetic material, the total sum of spacings between adjacent ferromagnetic sheets being larger than 0.5 mm.

DESCRIPTION OF THE PREFERRED EMBODIMENTS

Figure 1:
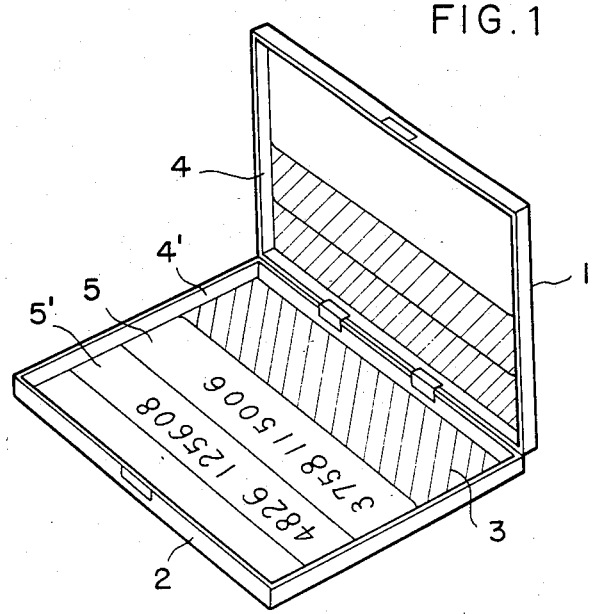
FIG. 1 is a perspective view showing a casing for containing a magnetic recording member embodying the invention, with its lid opened.

As above described, the magnetic shielding member of this invention comprises a laminated structure of a plurality of sheets of ferromagnetic material in which the sum of the spacings between the sheets is larger than 0.5 mm. We have found that when the exterior magnetic field acting upon magnetic recording members is less than about 200 gausses, the information stored in the magnetic recording members are not affected by the exterior magnetic field, and that the effect of the external magnetic field can be adjusted by varying the spacings, that is, air gaps. As a result of our exhaustive experiments, we have found that the total sum of the spacings should be larger than 0.5 mm regardless of the type and thickness of the magnetic sheets constituting the shielding member.

The two or more magnetic sheets are not necessarily made of the same material, and the spacings between adjacent magnetic sheets are not necessarily the same. For example, sheets of iron and silicon steel may be alternately stacked with gaps of 0.3 mm and 0.7 mm respectively between adjacent sheets (that is the total sum of the gaps is larger than 1.0 mm). The gaps can be maintained by using spacers at the peripheral portions of the magnetic sheets or by packing such fillers in the gaps as foamed styrol, urethane foam, sponges, a fiber assembly, non-woven fabric, felt, etc.

Numerical data of the gaps effective to the magnetic shielding member are as follows. The following table shows the construction of the spaced apart magnetic sheets and the values of gausses measured, wherein iron sheets each having a thickness of 0.3 mm are used as the magnetic sheets, a pole of a permanent magnet producing a magnetic field of 2000 gausses was contacted against one surface of the shielding member and the decrease in the magnetic field on the opposite surface was measured with a type 3251 gauss meter manufactured by Kabushiki-Kaisha Yokokawa Denki Seisakusho.

TABLE

| construction of magnetic shielding member (number of iron sheets and spacing there between) | measured gauss |
| --- | --- |
| 1 | 1080 |
| 2, no spacing | 600 |
| 2, spacing 1 mm | 320 |
| 2, spacing 2 mm | 180 |
| 3, no spacing | 100 |
| 3, sum of spacings 1 mm | 20 |
| 3, sum of spacings 2 mm | 8 |

This table shows that the value of the spacing is important to obtain desired shielding effect.

The magnetic sheet of this invention may be made of any ferromagnetic material and its configuration may be of any form, for example, sheet, mesh, wavy sheet or the like. However, the thickness of the sheet is preferably larger than 0.05 mm for the purpose of imparting sufficient stiffness to the magnetic shielding member.

The material of the magnetic shielding member is required to have a characteristic such that no magnetism remains therein even when the material is repeatedly contacted with a permanent magnet. In other words, the magnetism of the material must disappear quickly and completely when the permanent magnet is separated therefrom. For this reason, in this invention, it is advantageous to use ferromagnetic material which is magnetically "soft". Such soft ferromagnetic material includes iron, silicon steel sheet and various iron or steel alloys.

When the magnetic shielding member is constructed as a casing, all sides of the casing are not required to have a spaced apart layer construction and the size and configuration are not limited to any specific ones.

Figure 2:
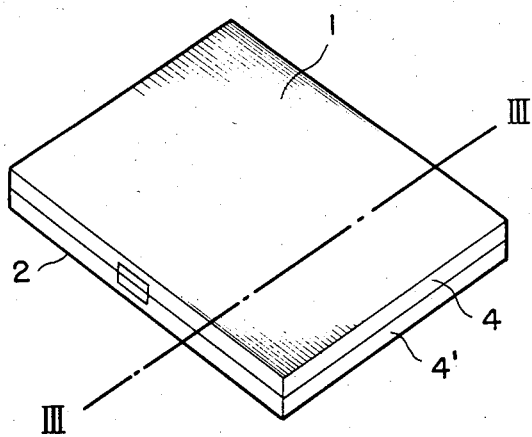
FIG. 2 is a perspective view of the casing shown in FIG. 1 when it is closed.
Figure 3:
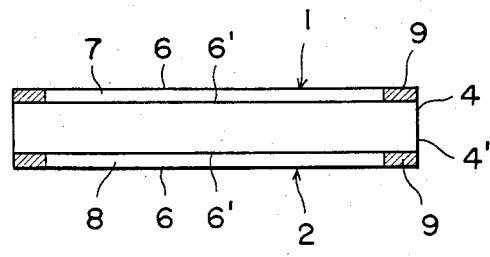
FIG. 3 is a cross-sectional view of the casing taken along a line III—III in FIG. 2.

Referring now to FIGS. 1 to 3 of the accompanying drawings, the magnetic shielding casing shown therein comprises a rectangular box shaped main body 2 and a lid 1 hinged to the main body 2. Both lid and main body have a spaced construction described above. When the lid is closed, the casing is closed at the peripheries 4 and 4' as shown in FIG. 2 so as to hold magnetic recording members 5 and 5' on magnetic card accepting zones 3. As shown in FIG. 3, each of the main body 2 and the lid 1 is constituted by spaced ferromagnetic sheets 6 and 6' with spacings 7 and 8 therebetween. The double walled main body and the lid efficiently shield the external magnetic field, thereby protecting the magnetic cards 5 and 5' contained in the casing.

In this embodiment, the spacings 7 and 8 may be maintained by spacers 9 disposed around the peripheries of the ferromagnetic sheets 6 and 6', but the spacings 7 and 8 are not filled with any filler.

Each sheet of magnetic material may have a composite construction in which on both sides of a cover sheet of magnetic material are bonded sheets of non-magnetic material.

Figure 4:
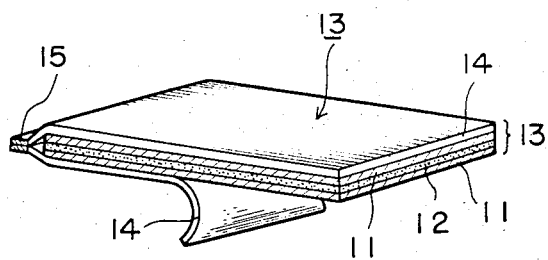
FIG. 4 is a pespective view showing another embodiment of this invention.

In the embodiment shown in FIG. 4, a laminated magnetic shielding member 13 comprises a pair of sheets 11 made of ferromagnetic materials, covers 14 made of such weldable non-magnetic material as polyvinyl chloride, ethylene acetate-vinyl copolymers, etc. and a spacer 12 interposed between the sheets 11. The peripheries of the covers 14 are welded together as at 15.

In the welding of the peripheries of the covers 14 at 15 with high frequency electric power, if the periphery of the sheets 11 were closely positioned to the weld 15, the high frequency electric power would be short circuited by the sheets 11, thus failing to form a satisfactory weld 15.

Figure 5:
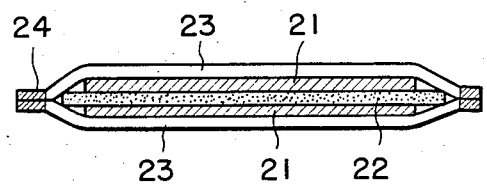
FIG. 5 is a sectional view showing still another embodiment of this invention.

In another embodiment of this invention shown in FIG. 5, the laminated magnetic shielding member is constituted by a sheet 22 of electric insulating material and located at the center, a pair of sheets 21 of ferromagnetic material and placed on both sides of the sheet 22, and covers 23 made of weldable substance described above. The peripheries of the covers are welded together at 24. This embodiment is characterized in that the sheet 22 has a wider surface than the ferromagnetic sheets 21. In other words, the peripheral portion of the sheet 22 extends outwardly beyond the periphery of the ferromagnetic sheets 21 for the purpose of separating as far as possible the ferromagnetic sheets away from the weld 24, thereby ensuring satisfactory high frequency welding.

As above described, the invention provides a magnetic shielding member in the form of a sheet or a casing having a small weight and can be manufactured with inexpensive material and yet can efficiently shield external magnetic fields.

What is claimed is:

1. A magnetic shielding device, comprising;
   a main body and a lid fitted to said main body to allow a magnetic recording member to be contained in said main body when said lid is in a closed position;
   each of said main body and said lid comprising at least two spaced sheets of ferromagnetic material, and
   spacing means for supporting said adjacent ferromagnetic sheets so that the total sum of the spacings between adjacent ferromagnetic sheets each of said main body and said lid is larger than 0.5 mm;
   wherein a magnetic field external of said main body and said lid when closed is substantially attenuated when passing inside said main body in the vicinity of a contained magnetic recording member.

2. The magnetic shielding device according to claim 1 wherein each said sheet of ferromagnetic material has a thickness of at least 0.05 mm.

3. The magnetic shielding device according to claim 1 wherein at least one of said sheets of ferromagnetic material comprises soft ferromagnetic material.

4. The magnetic shielding device according to claim 1, including insulating material interposed between adjacent sheets of ferromagnetic material of each of said main body and said lid and extending outwardly beyond the periphery of said sheets of ferromagnetic material.

5. The magnetic shielding device according to claim 1 which further comprises outer cover layers covering each of the groups of adjacent sheets of ferromagnetic material of each of said main body and said lid, peripheral portions of said cover layers being welded together.

6. The magnetic shielding device according to claim 5 which further comprises a sheet of insulating material having a surface larger than those of said adjacent sheets of ferromagnetic material of each of said main body and said lid, and interposed between the same.

7. The magnetic shielding device according to claim 1 wherein said adjacent sheets of ferromagnetic material of each of said main body and said lid are spaced from each other with non-magnetic spacers interposed between the adjacent sheets of ferromagnetic material, around their peripheral portions.

8. The magnetic shielding device according to claim 6, wherein the space between said adjacent sheets of ferromagnetic material and between said spacers is devoid of material.

* * * * *